(12) United States Patent
Cui et al.

(10) Patent No.: US 8,588,837 B2
(45) Date of Patent: Nov. 19, 2013

(54) POWER CONTROL FOR HANDOFFS BETWEEN VOICE OVER INTERNET PROTOCOL AND CIRCUIT SWITCHED CALLS

(75) Inventors: Dongzhe Cui, Parsippany, NJ (US); Yuan-Rong Shen, Randolph, NJ (US); I-Fong Antonio Wu, Hackettstown, NJ (US)

(73) Assignee: Alcatel Lucent, Paris (FR)

( * ) Notice: Subject to any disclaimer, the term of this patent is extended or adjusted under 35 U.S.C. 154(b) by 1972 days.

(21) Appl. No.: 11/376,749

(22) Filed: Mar. 15, 2006

(65) Prior Publication Data

US 2007/0217397 A1 Sep. 20, 2007

(51) Int. Cl.
*H04B 7/00* (2006.01)
*H04L 12/66* (2006.01)
*H04B 1/00* (2006.01)
*H04W 36/00* (2009.01)

(52) U.S. Cl.
USPC .............. 455/522; 455/69; 455/436; 370/352

(58) Field of Classification Search
USPC .............................. 455/522, 69, 436; 370/352
See application file for complete search history.

(56) References Cited

U.S. PATENT DOCUMENTS

| | | | | |
|---|---|---|---|---|
| 5,940,743 A | * | 8/1999 | Sunay et al. | 455/69 |
| 6,643,520 B1 | * | 11/2003 | Park et al. | 455/522 |
| 6,937,583 B1 | * | 8/2005 | Czaja et al. | 370/331 |
| 2002/0183086 A1 | * | 12/2002 | Hellmark et al. | 455/522 |
| 2006/0229074 A1 | * | 10/2006 | Semper | 455/436 |

OTHER PUBLICATIONS

3rd Generation Partnership Project 2, "3GPP2," 3GPP2 C.S0002-D, Version 1, date: Feb. 13, 2004, Physical Layer Standard for cdma2000 Spread Spectrum Systems, Revision D, pp. 1-15 thru 1-17; 2-129 thru 2-132; 2-137; 2-149 thru 2-150; 2-5 thru 2-6; 2-10 thru 2-12.
3rd Generation Partnership Project 2 "3GPP2," 3GPP2 C.S0024-A, Version 2.0, Date: Jul. 2005, cdma2000 High Rate Packet Data Air Interface Specification, pp. 12-10; 12-40 thru 12-41; 12-53; 13-9 thru 13-13-10; 13-88.

\* cited by examiner

*Primary Examiner* — Christopher M Brandt
*Assistant Examiner* — Muthuswamy Manoharan
(74) *Attorney, Agent, or Firm* — Carlson, Gaskey & Olds, P.C.

(57) ABSTRACT

An open loop power control method for setting a transmit power of mobile station (22) during a handoff from a voice over Internet protocol (VoIP) service to a circuit switched service sets a transmit power of the mobile station based upon a power level associated with the VoIP call. A disclosed example includes using an average power level of a reverse pilot channel of the VoIP call and correction factors based upon forward link and reverse link parameters during the VoIP call.

12 Claims, 3 Drawing Sheets

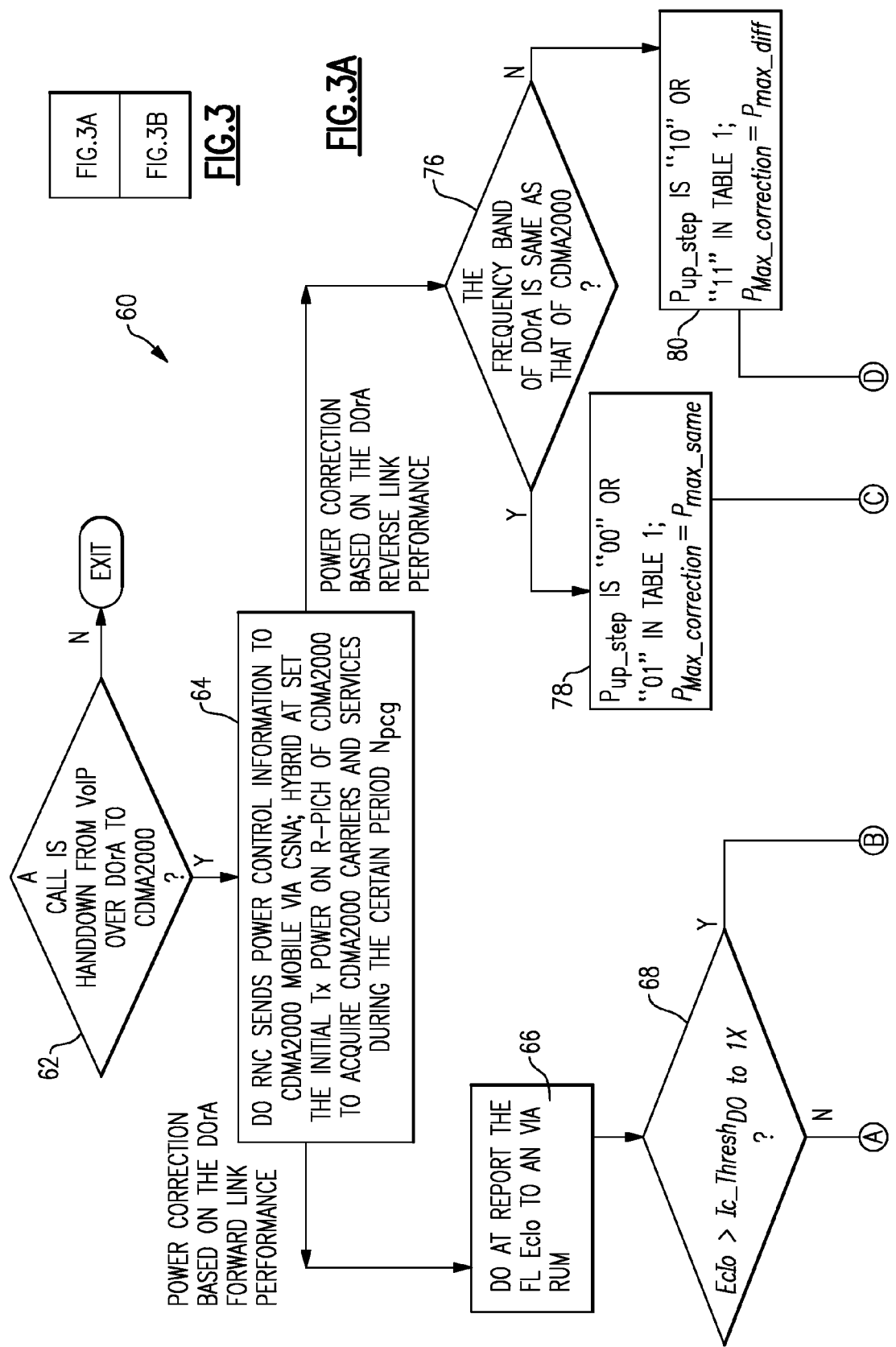

POWER CONTROL FOR HANDOFFS BETWEEN VOICE OVER INTERNET PROTOCOL AND CIRCUIT SWITCHED CALLS

FIELD OF THE INVENTION

This invention generally relates to communications. More particularly, this invention relates to wireless communications.

DESCRIPTION OF THE RELATED ART

Wireless communications are well known. For several years now, widespread use of cellular communication systems have allowed individuals to conduct voice communications using circuit switched technology. CDMA 2000 and UMTS systems are two examples of circuit switched technologies.

More recently, it has become possible to conduct voice communications using a voice over Internet protocol (VoIP) technique. Some mobile stations (e.g., cell phones) are hybrid devices in that they support circuit switched calls and VoIP calls. In some cases, it will be necessary to complete a handoff from a VoIP call to a circuit switched call to provide the subscriber with seamless service. The coverage area for many VoIP transceivers that communicate with mobile stations is typically more limited than that provided by circuit switched call transceivers (e.g., base station transceivers). It is likely, therefore, for an individual conducting a VoIP call to move into an area where VoIP coverage is not available but circuit switched call coverage is available.

Conducting a handoff from a VoIP call to a circuit switched call presents various challenges. One challenge is to achieve an appropriate transmit power for acquiring the circuit switched call services without dropping the VoIP call, for example. Power settings for VoIP calls are typically lower than that used in circuit switched networks. For example, the transmit powers used in 1×EVDO-revision A (DOrA) networks is lower than that used in CDMA 2000 networks. To conduct a handoff, therefore, the mobile station transmit power must be boosted from that used in the VoIP call to a level sufficient to acquire the circuit switched services.

It is also a challenge to conduct a handoff within a short enough period of time. Another challenge is how to avoid undesirable interference for circuit switched base stations. Blindly increasing the transmit power of the mobile station when attempting to handoff over to a circuit switched call can introduce undesirable interference for the circuit switched base station and, therefore, some technique for controlling the transmit power is required. There is a need for a technique for setting the power level for the mobile station to acquire the circuit switched service successfully while saving the mobile station's battery power and alleviating loading at the base station. It is desirable to achieve successful handoffs without setting the mobile transmit power at a maximum power level.

The challenge is further complicated by the fact that while a mobile station is conducting a VoIP call, it does not monitor the circuit switched pilot channel and there is no paging monitoring process associated with the circuit switched channel to which the mobile station should be handed off. Additionally, the VoIP call and the circuit switched call may be on different carriers or in different frequency bands.

This invention provides a technique for conducting handoffs between VoIP calls and circuit switched calls that addresses the needs and avoids the drawbacks mentioned above.

SUMMARY OF THE INVENTION

An exemplary method includes performing a handoff between a voice over Internet protocol (VoIP) call and a circuit switched call by setting a power level for the circuit switched call based upon an average power of a pilot channel of the VoIP call.

One example includes setting the power level for a pilot channel for the circuit switched call based on an average of the power of the pilot channel of the VoIP call during a recent time interval. One example uses an average over a recent 500 millisecond period.

One example includes initializing the power level for the circuit switched call during handoff and sequentially increasing the power level until the handoff is complete or a maximum power level is reached.

One example includes using correction factors corresponding to forward link and reverse link characteristics of the VoIP call.

The various features and advantages of this invention will become apparent to those skilled in the art from the following detailed description. The drawings that accompany the detailed description can be briefly described as follows.

DETAILED DESCRIPTION

This invention provides a power control technique for conducting handoffs between voice over Internet protocol (VoIP) calls and circuit switched calls. A disclosed example includes setting a mobile station transmit power for acquiring the circuit switched call services during a handoff based upon a power level associated with a pilot channel of the VoIP call.

Figure 1:
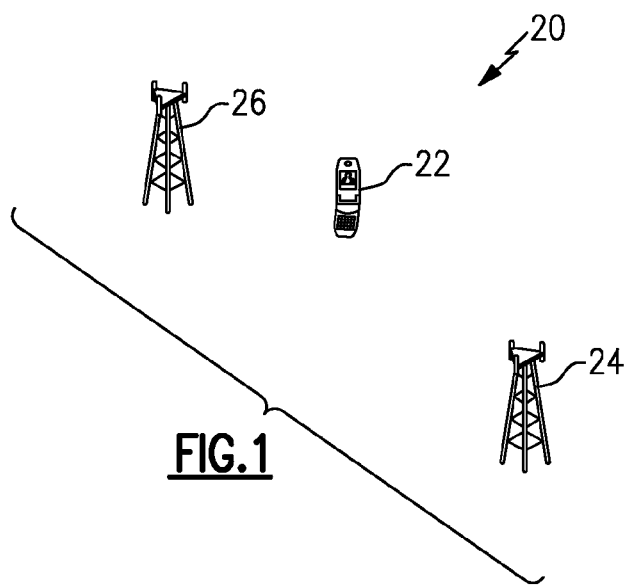
FIG. 1 schematically shows selected portions of a wireless communication system useful with an embodiment of this invention.

FIG. 1 schematically shows selected portions of a wireless communication system 20. A mobile station 22 has the capability of conducting voice communications. The illustrated example includes a so-called hybrid mobile station that is capable of conducting voice communications through a circuit switched network such as a UMTS or CDMA 2000 system or VoIP calls using a 1×EVDO-revision A system, for example.

In the illustration, the mobile station 22 is conducting a VoIP call and communicating with a transceiver device 24 that facilitates VoIP communications. As the mobile station 22 approaches an edge of a coverage area provided by the transceiver device 24, the mobile station 22 desires to handoff to another transceiver. If no other VoIP transceivers are available, the handoff will require switching over to another voice communication service. The illustrated example includes a base station transceiver 26 that facilitates voice communications using a circuit switched network. In one example, the circuit switched network is a CDMA 2000 network. Completing a handoff to the circuit switched voice service will provide seamless service to the user of the mobile station 22 and avoid dropping the call as the mobile station 22 leaves the coverage area provided by the transceiver device 24.

Figure 2:
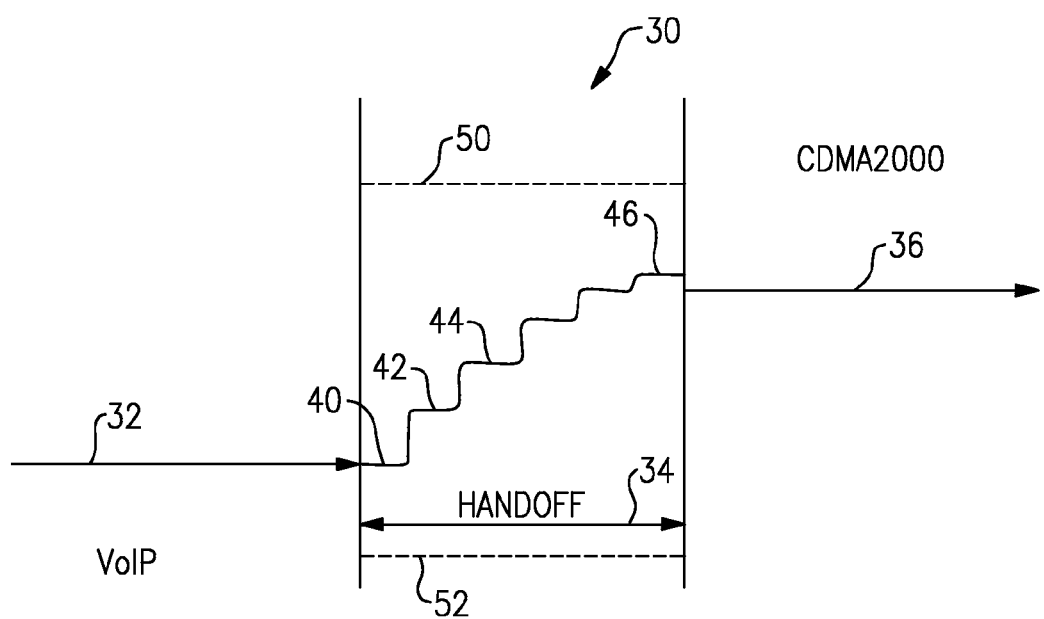
FIG. 2 schematically illustrates selected features of an example technique used with an embodiment of this invention.

FIG. 2 schematically shows an example handoff process 30. The left hand side of the illustration corresponds to the VoIP call, which is conducted using a mobile station transmit power shown at 32. The handoff occurs over a handoff interval 34 and results in acquiring the circuit switched service for continuing the voice communication as a circuit switched call using a transmit power shown at 36. Part of the challenge in conducting the handoff procedure schematically shown at 30 is achieving an appropriate mobile station transmit power to acquire the circuit switched services for successfully completing the handoff.

For example, different traffic to pilot channel gains are used in VoIP and circuit switched systems. Using 1×EVDO-revision A (DOrA) and CDMA 2000 systems as examples, the VoIP call requires about 1 dB lower transmit power for a reverse pilot channel than that used in the CDMA 2000 system. During a handoff between a DOrA VoIP call and a CDMA 2000 circuit switched call, the transmit power at the mobile station must be boosted for acquiring the circuit switched service quickly and successfully. Some control must be placed on the boosting of this power because if it becomes too high compared to other working VoIP and circuit switched mobiles, there may be unacceptable interference to the serving base stations resulting in a loss of base station capacity or throughput.

The example of FIG. 2 includes setting a mobile station transmit power for use during the handoff procedure at a level corresponding to a power level of a pilot channel of the VoIP call. In one example, a reverse link pilot channel transmit power for acquiring the circuit switched call is set based upon an average reverse link pilot channel power of the VoIP call. In one example, the average is taken over a recent time interval such as 500 milliseconds. This approach accommodates the differences in transmit powers associated with VoIP calls and circuit switched calls, avoids unwanted interference, conserves mobile station battery power and facilitates a quick handoff.

By reasonably setting the power level for the mobile station to acquire the circuit switched service quickly and successfully, the example open loop power control technique allows the mobile transmit power to be set based upon recent performance of the forward and reverse link of the VoIP call. Even when the VoIP call and the circuit switched call are on different carriers of the same sector, the average power of the forward and reverse link performance metrics will match each other after fast fading is averaged out over a sufficient time interval. That is why one example includes a 500 millisecond time interval during which an average power of a pilot channel for the VoIP call is taken.

As schematically shown in FIG. 2, the mobile transmit power is initially set at 40. This power level is maintained for a selected time and, if the handoff has not been completed, the power level is incremented to a higher value at 42. The transmit power level for the mobile station is then sequentially incremented as shown at 44 and eventually reaches a level at 46 when the handoff to the circuit switched call is complete.

The illustration in FIG. 2 includes a maximum limit 50 on the transmit power used during the handoff. In one example, the limit 50 corresponds to the maximum mobile station transmit power for acquiring the circuit switched voice services. In one example, the limit 50 is 200 mw. The maximum power limit may be dependent on an acceptable transmit power for the current VoIP call or the anticipated circuit switched call, for example. A lower limit 52 places a minimum on the mobile transmit power during the handoff. The lower limit 52 may correspond to a lock threshold for the VoIP call to ensure that the VoIP call is not dropped before a successful handoff, for example. In one example, the lower limit shown at 52 is the minimum mobile station transmit power for acquiring the circuit switched voice services. In one example, the limit 52 is 20 mw.

Figure 3B:
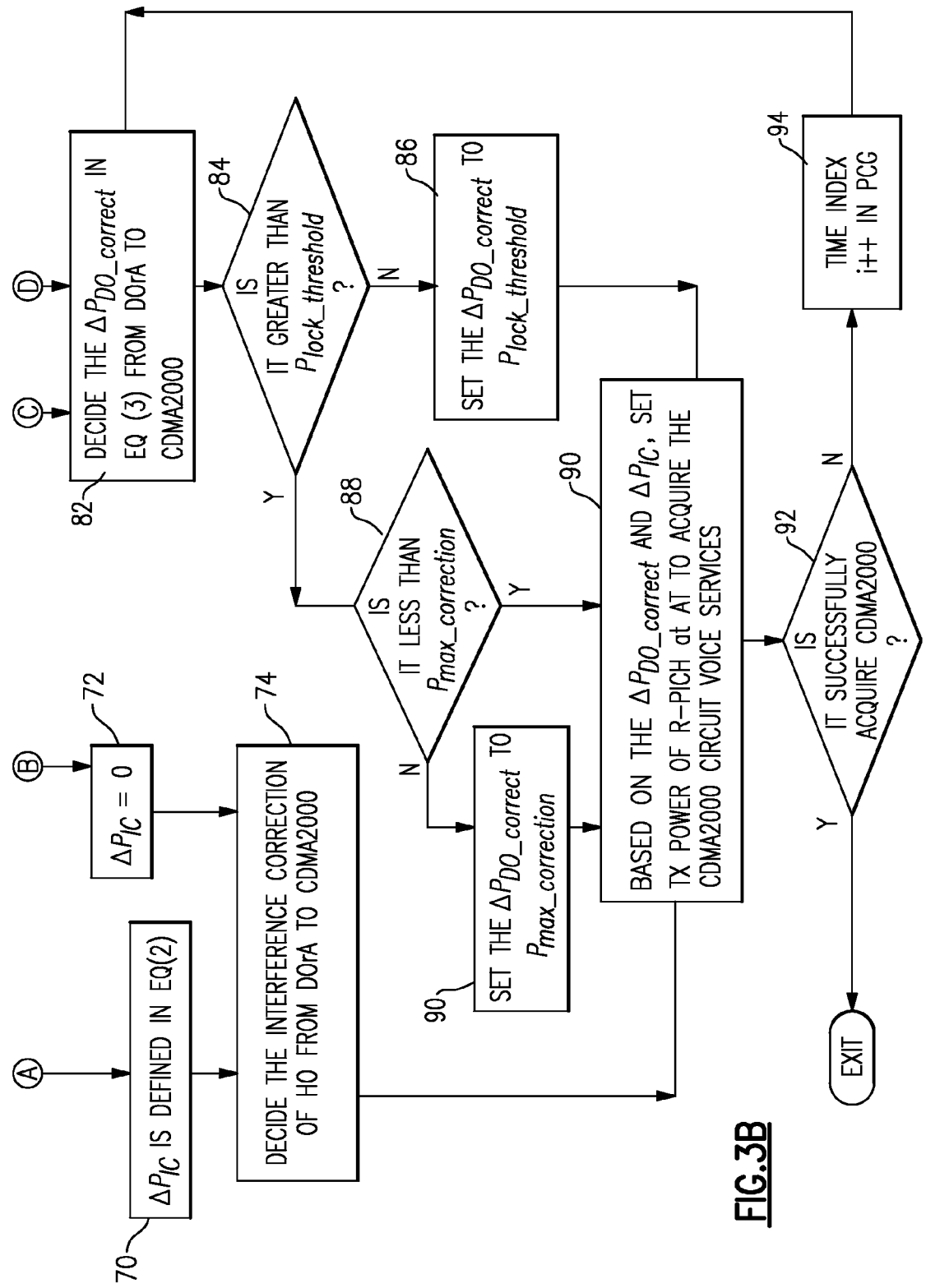
FIG. 3 is a flowchart diagram summarizing an example approach.

FIG. 3 includes a flowchart diagram 60 illustrating one example approach. The flow chart 60 begins at 62 where a determination is made that a call handoff is required between a VoIP call and a circuit switched call. Upon detecting the need for such a handoff, an appropriate controller associated with the VoIP call sends power control information to the mobile station for setting a transmit power to be used during the handoff process. One example includes using a standard defined protocol of a circuit services notification application (CSNA) to send the circuit switched service origination message to the mobile station over the VoIP interface. In the illustrated example, the initial transmit power will be used for the reverse pilot channel of the circuit switched call to acquire the circuit switched carriers and services during the handoff period.

The illustrated example includes using an open loop power control method to address the difference in power levels associated with the VoIP call and the circuit switched call. One example includes setting the mean power of the reverse pilot channel for the circuit switched call using the following equation:

$$\overline{P}_{R\text{-}PICH} = \overline{P}_{DOrA} + \Delta P_{IC} + \Delta P_{DO\_correct} \quad (1);$$

where $P_{R\text{-}PICH}$ is the mean power of the circuit switched reverse link pilot channel, $P_{DOrA}$ is the average power of the VoIP call pilot channel averaged over a period such as 500 milliseconds, $\Delta P_{IC}$ is a power correction factor corresponding to a forward link of the VoIP call and $\Delta P_{DO\_correct}$ is a power correction factor corresponding to a reverse link of the VoIP call. As can be appreciated from the above equation, the transmit power for the mobile station during handoff is based upon a power level of a pilot channel associated with the VoIP call. In this particular example, the reverse link pilot channel transmit power for acquiring the circuit switched call services is set based upon an average of a pilot channel power level of the VoIP call over a recent time interval. This example also includes correction factors based upon forward link and reverse link characteristics of the VoIP call.

In FIG. 3, the power correction factor based upon the forward link of the VoIP call is determined beginning at 66 where the mobile station reports a forward link signal to noise ratio. In this example, the signal to noise ratio (e.g., Ec/Io in dB) per carrier of the strongest active set pilot channel in the VoIP call forward link measured by the mobile station within the previous 500 milliseconds is reported. In one example, this is reported to access network (AN) and in particular to the base station handling the VoIP call in a route update message (RUM).

In one example, the step at 66 includes the base station handling the VoIP call asking the mobile station to report a forward link signal to noise ratio periodically for use in determining when the trigger of the handoff between the VoIP call and the circuit call is initialized.

A decision is made at 68 whether the reported signal to noise ratio is greater than an interference correction threshold, which in one example ranges between −15 dB and 0 dB. If the signal to noise ratio is less than the interference correction threshold, then $\Delta P_{IC}$ is determined at 70 based upon the following relationship.

$$\Delta P_{IC} = (\max(IC\_\text{Thresh}_{DOto1X} - ECIO, 0), IC\_\text{MAX}_{DOto1X}) \quad (2)$$

In one example, the interference correction threshold is coated with four bits in 1 dB units and a base station can reset the parameter by translation such that the interference correction threshold level equals $-1*IC\_Thres_{DOto1X}$.

If the signal to noise ratio is greater than the interference correction threshold, then $\Delta P_{IC}$ is set to 0 at 72. The appropriate interference correction $\Delta P_{IC}$ is set at 74 in the example of FIG. 3.

The correction factor related to the reverse link of the VoIP call is set in the example of FIG. 3 beginning at 76. A determination is made whether the frequency band of the VoIP call is the same as that of the circuit switched call. If so, the increment used for increasing the power level is set at 78 to a selected value and a maximum correction power (e.g., the level 50 shown in FIG. 2) is set to correspond to a maximum correction power associated with the frequency bands of the VoIP call and the circuit switched call being the same. In one example, when the frequency bands are the same, one of two step size increments are selected. One example includes a step size of 0.00 dB or a step size of 0.25 dB.

If the frequency band of the two calls involved in the handoff are different, then the increment is set at 80 to another value and the maximum correction value is set based upon the different frequency bands. In one example, the increment is either 0.50 dB or 1.00 dB when the frequency bands are different. In one example, the maximum power when the frequency bands are different is 3 dB greater than the maximum power when the frequency bands are the same.

The process in FIG. 3 continues at 82 where the value of $\Delta P_{DO\_correct}$ is set. A decision is made at 84 whether that value is greater than the lock threshold for the circuit switched carrier reverse pilot channel. If not, the procedure of FIG. 3 continues at 86 where the reverse link correction factor is set to the locked threshold of the circuit switched carrier reverse pilot channel.

If the reverse link correction factor is greater than the lock threshold, a decision is made at 88 whether it is less than the maximum allowable correction value for the reverse pilot channel of the circuit switched call. If not, the process continues at 90 by setting $\Delta P_{DO\_correct}$ to the maximum correction value. Otherwise, as schematically shown at 91 the transmit power for the reverse pilot channel for acquiring the circuit switched call services is set based upon the average power level of the VoIP pilot channel and the correction factors.

The handoff is then attempted and a determination is made at 92 whether it was successfully completed. If not, the power level will be incremented as schematically shown in FIG. 2. In FIG. 3, the block 94 includes a time index that is used based upon power control groups associated with the VoIP channel during the handoff interval 34 (FIG. 2). In one example, the reverse link power correction factor is incremented using $$\Delta P_{DO\_correct} = P_{up\_step} *i, i=1,2,\ldots,N_{PCG} \quad (3);$$

where $N_{PCG}$ is the total number of power control groups within the handoff interval. For example, the target time for the handoff transition period in one example is approximately 40 milliseconds. This corresponds to $N_{PCG}=32$. If the mobile station does not successfully acquire the circuit switched call service in a first one of the PCGs, $\Delta P_{DO\_correct}$ in the next PCG is increased by $P_{up\_step}$ using increments selected at 78 or 80 in FIG. 3, for example, and described above.

The power correction factor $\Delta P_{DO\_correct}$ in one example is always maintained greater than the lock threshold of the circuit switched carrier reverse pilot channel and less than the maximum correction power threshold of the reverse pilot channel.

As can be appreciated from the above description, the example technique controls mobile station transmit power during a handoff between a VoIP call and a circuit switched call that keeps relative interference levels small and does not introduce pilot pollution or overload the circuit switched network. Additionally, avoiding using the maximum transmit power conserves the mobile station's battery power.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method, comprising
performing a handoff between a voice over Internet protocol (VoIP) call and a circuit switched call including
setting a power level for the circuit switched call based upon an average power of a pilot channel of the VoIP call.

2. The method of claim 1, comprising
setting the power level for a pilot channel for the circuit switched call based on an average of the power of the pilot channel of the VoIP call during a recent time interval.

3. The method of claim 1, comprising
initializing the power level; and
sequentially increasing the power level until the handoff is complete or a maximum power level is reached.

4. The method of claim 1, comprising
setting the power level using a first correction factor that is based on a forward link of the VoIP call.

5. The method of claim 4, wherein the first correction factor is based on a strongest active set pilot channel of the VoIP forward link within a recent time period.

6. The method of claim 5, wherein the first correction factor is based on a parameter comprising the greater of:
(i) a difference between an interference correction threshold and a received signal to noise ratio of the strongest active set pilot channel, and
(ii) zero.

7. The method of claim 6, wherein the first correction factor is based on the lesser of the parameter or an interference correction maximum.

8. The method of claim 4, comprising
setting the power level using a second correction factor that is based on a reverse link of the VoIP call.

9. The method of claim 8, comprising
incrementally increasing the second correction factor until the handover is completed or a maximum value for the second correction factor is reached.

10. The method of claim 9, comprising
increasing the second correction factor in one amount if the VoIP call and the circuit switched call are in the same frequency band class and otherwise increasing the second correction factor in another amount.

11. The method of claim 9, comprising
increasing the second correction factor with each power control group during an attempted handover.

12. The method of claim 1, wherein the power level comprises a transmit power level of a mobile station involved in the handoff.

\* \* \* \* \*